United States Patent
Aitken et al.

[15] 3,674,725
[45] July 4, 1972

[54] CATIONIZATION OF STARCH FOR FILLER RETENTION UTILIZING A CATIONIC POLYEPIHALOHYDRIN-TERTIARY AMINE POLYMER

[72] Inventors: Thomas Aitken, Chicago; Donald R. Anderson, Oswego; Myron J. Jursich, Chicago, all of Ill.

[73] Assignee: Nalco Chemical Company, Chicago, Ill.

[22] Filed: Dec. 18, 1970

[21] Appl. No.: 99,686

[52] U.S. Cl. ...............................260/9, 106/210, 162/165, 162/168, 162/175, 260/233.3 R
[51] Int. Cl. ..................................C08b 25/02, D21h 3/28
[58] Field of Search ..............162/165, 168, 175; 260/233.3, 260/9; 106/210

[56] References Cited

UNITED STATES PATENTS 3,320,317  5/1967  Rogers et al. .......................260/567.6
2,876,217  3/1959  Paschall ..........................260/233.3 R
3,448,101  6/1969  Billy et al. .............................162/175

FOREIGN PATENTS OR APPLICATIONS 404,812  8/1969  Australia ...........................260/233.3

OTHER PUBLICATIONS

Chem. Abst. 74: 142,628N, " Quaternary- Agents," Firestone Tire & Rubber

Primary Examiner—William H. Short
Assistant Examiner—Edward Woodberry
Attorney—John G. Premo, Charles W. Connors and Edward A. Ptacek

[57] ABSTRACT

A method of cationization of starch is disclosed which involves reacting starch at alkaline conditions with a polymer formed from polyepichlorohydrin and an amine.

18 Claims, No Drawings

CATIONIZATION OF STARCH FOR FILLER RETENTION UTILIZING A CATIONIC POLYEPIHALOHYDRIN-TERTIARY AMINE POLYMER

Starches of different types have been used in the production of paper for many years to achieve varying aims such as to increase sheet strength. Indicative of this wide-spread usage are the various uses of starch described in the prior art.

Nevertheless, there are difficulties in using starch. One of the chief difficulties in using starch as a wet end additive for improving various papers is that it is difficult to adequately retain the starch in the sheet. In most instances the majority of starch added is lost in the papermaking process. Many attempts have been made to improve retention of starch by cellulosic fibers.

In some instances efforts have been made to thermally modify starch. In other instances starch has been treated with chemicals in attempts to render it more susceptible to being retained by fibers. While both of these approaches have met with some measure of success in improving the retention characteristics of starch, nevertheless a high percentage of starch is lost through non-adherence to the paper fibers.

It would be advantageous to the art of papermaking if it were possible to provide a simple method for improving the ability of starch to be retained by cellulosic fibers. Also of interest would be a paper manufacturing process which in a series of operation steps, would render the common starches more receptive to cellulosic fibers by prior reaction of the starch materials with relatively inexpensive organic chemicals. By improving the receptivity of cellulosic fibers to common starches reacted with organic chemicals, it should be possible to produce paper having a greater amount of starch contained therein. This will afford a finished sheet having superior dry strength and many other improved characteristics which flow from the incorporation therewith of bonded well-dispersed starches.

OBJECTS

It is, therefore, an object of this invention to provide an improved process for the manufacture of paper. Another object is to provide a method whereby starch may be inexpensively and simply reacted just prior to introduction into the pulp stream so that it is highly receptive to cellulosic fibers. A further object is to furnish a method for reacting starch to produce a starch product of extreme value to the papermaking industry. Another object is a simple process for starch cationization. Still further objects of this invention are the modification of starches for wet end application in the papermaking process and for improvements in paper strength, improved retention of filler and fines, and drainage improvement. Other objects will appear hereinafter.

THE INVENTION

Broadly, this invention discloses the cationization of starch. More narrowly, this invention discloses the reaction of starch with cationic polymers in an aqueous, alkaline medium.

The cationic polymers are prepared by the reaction of polyepichlorohydrin and an amine.

POLYEPICHLOROHYDRIN-AMINE REACTION PRODUCTS

Preferably, the cationic polymer is produced by the partial quaternization of polyepichlorohydrin with an amine, preferably a trialkyl amine, and even more preferably trimethyl amine. The quaternization should be at least 15 percent complete. Preferably, it should be 40 percent complete and even more preferably, at least 50 percent complete. It could be 80 percent complete or more and still be effective.

The Backbone

The backbone of the polymer consists of polyepihalohydrin, with polyepichlorohydrin being preferred because of its ready availability. Naturally, polyepibromohydrin could also be used.

The polyepichlorohydrin can be made by any standard procedure known to the art. For example, epichlorohydrin could be polymerized using any well known catalyst such as Lewis acids, for example, stannic chloride, boron trifluoride, bisalkylhalo aluminum, trialkyl aluminum, and alkoxide aluminum. Preferably, the polyepichlorohydrin is made using triisobutoxy aluminum catalyst. The term polyepichlorohydrin is used generically and is meant to include copolymers of epichlorohydrin and other monomers such as ethylene oxide and ethylene glycol. The backbone, however, should contain at least 20 percent by weight epichlorohydrin and up to 100 percent.

Preferably, the polyepichlorohydrin has a molecular weight from 1,000 to 100,000 and even more preferably from 2,500 to 25,000.

Following is an example of the preparation of polyepichlorohydrin.

EXAMPLE I

Thirty-eight hundred pounds of epichlorohydrin was charged to a reactor and agitated. The reactor was cooled to 60° C. under nitrogen pressure of 5 pounds per square inch. 160 pounds of 25 percent triisobutyl aluminum in toluene was added slowly at 60°—70° C. until an exothermic reaction was noted. The temperature was allowed to increase controllably to 100° C. with cooling as required. When the initial reaction subsided, the temperature was maintained at 100°—110° C. to remove one or two drums of condensate.

Similar methods of preparing the polyepichlorohydrins are disclosed in U.S. Pat. No. 3,135,705.

The Amines

Various amines can be used to react with the polyepichlorohydrin. The term "amine" is used in a very broad sense. By illustration, trimethyl amine, dimethyl amine, pyridine, dibasic acid amines, ethylenimine, and dimethyl ethanol amine have been used.

Preferably, this class of polymers is made by the quaternization of polyepichlorohydrin with trialkyl amines.

Following is an example of the quaternization of polyepichlorohydrin with trimethyl amine.

EXAMPLE II

The quaternization consisted of reacting 26.2 pounds of polyepichlorohydrin produced according to Example I with 73.8 pounds of 25 percent aqueous trimethyl amine. The reactants were mixed at below 80° C. The reactor was then closed from the atmosphere and heated to 100 pounds per square inch which was approximately 90°–100° C. This was held for 16 hours. The temperature was slowly increased at 100 psig and held at 130°–140° C. for 2 hours. This was then cooled to 70°–80 C. and neutralized to a pH of 5.5 to 6.5 with 250—500 pounds of 30 percent aqueous hydrochloric acid.

Table I lists various ratios of amines reacted with the polyepichlorohydrin of Example I, and is referred to as R–5. R–3 is another type of backbone formed by boron trifluoride catalyzed reaction product of 6 moles of epichlorohydrin and 1 mole of ethylene glycol.

TABLE I

| Product No. | Backbone | Moles | Amine | Neutralization |
|---|---|---|---|---|
| 1 | R–5 | 0.167 | Trimethyl | |
| 2 | R–5 | 0.20 | Trimethyl | 0.01 moles HCl |
| 3 | R–5 | 0.25 | Trimethyl | 0.01 moles HCl |
| 4 | R–5 | 0.33 | Trimethyl | |
| 5 | R–5 | 0.50 | Trimethyl | 0.05 moles HCl |
| 6 | R–5 | 0.80 | Trimethyl | 0.05 moles HCl |
| 7 | R–5 | 1.05 | Trimethyl | 0.10 moles HCl |
| 8 | R–5 | 1.00 | Pyridine | 0.09 moles HCl |
| 9 | R–5 | 1.00 | N,N-dimethyl ethanol | 0.10 moles HCl |

| | | | | |
|---|---|---|---|---|
| 10 | R-3 | 1.00 | Trimethyl | 0.10 moles HCl |
| 11 | R-3 | 1.00 | Trimethyl | 0.01 moles HCl |
| 12 | R-3 | 0.50 | Pyridine | 0.02 moles HCl |
| 13 | R-3 | 1.00 | Pyridine | 0.10 moles HCl |
| 14 | R-3 | 0.50 | Triethanol | 0.09 moles HCl |

APPLICATION CONDITIONS

To convert unmodified starches to cationic starches, the starches are reacted with the heretofore mentioned polymers under aqueous, alkaline conditions. The alkaline agent and the polymer may be added to the starch at any stage such as before cooking, during cooking, or after cooking the starch. For different polymers, the preferred point of application can vary with the polymer, with the degree of alkalinity prevailing, with the cooking conditions, and with various other parameters. Either batch cooking or jet cooking of the starch can be used.

The cationization should take place in aqueous alkaline media because it is believed that the alkali activates the OH groups of the starch to increase its effectiveness. The various parameters will be discussed individually.

Alkaline conditions means a system having a pH above about 7.0 and preferably above 8.5. This system could have a pH of about 13.0 or more.

For simplicity of handling, certain polymers, such as product No. 5 from Table I, can be preblended with the dry starch. Thus, on slurrying and cooking, only the addition of an alkaline agent is required. Alternatively, certain alkaline agents, i.e., lime, can be preblended with the dry starch, such that on slurrying and cooking, only the addition of a cationic polymer is required.

The polymer and the alkaline agent could both be dry blended with the starch, thus making a subsequent addition unnecessary.

Although sodium hydroxide is the preferred alkaline agent, other alkaline agents could be used, such as potassium hydroxide, trisodium phosphate, sodium aluminate or lime.

RESULTS

To test the effectiveness of the products of Table I for starch cationization, they were cooked with starch and alkali, and the cooked starch was evaluated by wet-end addition in papermaking. Much of this work involved preparation of handsheets on a laboratory Noble and Wood machine.

Burst strength improvement over the untreated stock was taken as a measure of the effectiveness of starch cationization. For burst comparisons, we used unbleached softwood kraft pulp of 40 seconds Williams freeness. Basic weight was 100 grams per square meter. An alum-free system was used. Without starch treatment, this pulp generally gave a burst strength of about 50 psi.

The following table shows burst strength improvements for application of 1.25 percent starch modified with polymers No. 5 and No. 10 from Table I and for other modifications.

TABLE II

| Starch Modification % Polymer on Starch | % Alkali on Starch | Burst Improvement Over Untreated Stock |
|---|---|---|
| 5% No. 5 | 5% NaOH | 15.1 |
| 5% No. 10 | 5% NaOH | 16.2 |
| — | — | 3.0 |
| 5% No. 10 | — | 7.0 |
| — | 5% NaOH | 3.4 |
| 5% polyethyl enimine* | 5% NaOH | 7.1 |

*An amine polymer used as a basis of comparison to the cationic polymers of this invention.

In the above, the third, fourth and fifth results are in untreated starch, starch cooked with polymer alone, and starch cooked with caustic alone. Thus, without use of both the polymer and alkali, burst strength improvements are relatively low.

The last example shows the use of starch, caustic and an amine polymer without reactive epoxide of halogen groups. As can readily be seen this is not as effective as using the No. 5 or the No. 10 products which contain reactive epoxide and/or halogen groups.

The reaction products of about 0.5 moles of amine per chlorine equivalent of polyepichlorohydrin are preferred, but ranges from about 0.2 to about 0.8 moles of amine per chlorine equivalent are generally suitable.

Table III lists a series of burst improvement using various trimethyl amine substituted polyepichlorohydrins.

Polymer products are identified according to Table I. As in table II, starch application was 1.25 percent on the weight of the pulp furnish.

TABLE III

| Starch Modification | | Moles Trimethyl Amine per Chlorine Equivalent Used in Modifying the Polymer | Burst Increase Over Blank |
|---|---|---|---|
| Polymer On Starch | % NaOH On Starch | | |
| 5% No. 1 | 5% | 0.167 | 6.9 |
| 5% No. 2 | 5% | 0.20 | 10.5 |
| 5% No. 3 | 5% | 0.25 | 11.7 |
| 5% No. 4 | 5% | 0.33 | 12.1 |
| 5% No. 5 | 5% | 0.50 | 15.1 |
| 5% No. 6 | 5% | 0.80 | 11.8 |

Concerning the level of polymer application, preferably, polymer application levels are generally in the range from 0.5 percent to 5.0 percent active polymer based on the starch weight. Generally, a range of from about 0.1 percent to about 10.0 percent of the active resin could be used. The following table lists various ranges of the polymer. Starch application was 1.25 percent based on the weight of the pulp finish.

TABLE IV

| Starch Modification | | |
|---|---|---|
| % Active Polymer On Starch | % Active Alkali On Starch | Burst Improvement Over Blank, Points |
| 1.0% No. 5 | 5% NaOH | 11.4 |
| 3.0% No. 5 | 5% NaOH | 13.2 |
| 5.0% No. 5 | 5% NaOH | 15.4 |

STARCHES

This invention can be used to modify any polyhydroxy material, and preferably, any of the common unmodified starches such as corn starch, tapioca, potato, wheat, and any other well known starches. This invention could also be used for further modification of certain modified starches, e.g., coating starches. The following table is illustrative of the use of different starches.

TABLE V

| Application* | Burst Improvement Over Blank, Points |
|---|---|
| 1.25% corn starch, 5% No. 5, 5% NaOH | 15.4 |
| 1.25% tapioca starch, 5% No. 5, 5% NaOH | 16.9 |

| 1.25% potato starch, 5% No. 5, 5% NaOH | 18.7 |
|---|---|

*In the above, starch application is weight percent based on the pulp furnish, while No. 5 and NaOH applications are weight percent based on the starch.

The following table illustrates the use of various dosages of the alkaline agent, which in this case is sodium hydroxide. Starch application was 1.25 percent on weight of pulp furnish.

TABLE VI

| Starch Modification | | |
|---|---|---|
| % Polymer On Starch | % Alkali On Starch | Burst Improvement Over Blank, Points |
| 5% active No.5 | 1% NaOH | 10.8 |
| 5% active No.5 | 3% NaOH | 13.0 |
| 5% active No.5 | 5% NaOH | 15.4 |

FILLER RETENTION

In order to test the retention ability of the polymer, the following procedure was used for Noble & Wood handsheet comparisons. The stock was a bleached sulfite and bleached kraft blend. 15 percent filler was applied in a ratio of 12:3 of clay to titanium dioxide. Alum application was 1 percent and the head box pH was 5.5. The ash test was used to indicate filler retention. Increase in ash is indicative of increased filler retention. Following are test results.

TABLE VII

| Starch Application Pounds per Ton | Ash % | Increase Over Blank Percent |
|---|---|---|
| Comparisons with Potato | | |
| No Starch | 6.29 | – |
| 5.6 lb. | 8.52 | 2.25 |
| 5.6 lb., 5% active No. 5 | 10.45 | 4.16 |
| 5.6 lb., 5% NaOH | 6.43 | 0.14 |
| 5.6 lb., 0.5% active No. 5, 5% NaOH | 11.25 | 4.98 |
| 5.6 lb., 2.0% active No. 5, 5% NaOH | 11.48 | 5.19 |
| 5.6 lb., 5.0% active No. 5, 5% NaOH | 12.26 | 5.97 |
| Comparisons with Tapioca | | |
| No Starch | 6.70 | – |
| 5.6 lb. | 7.23 | 0.53 |
| 5.6 lb., 5% active No. 5 | 8.04 | 1.34 |
| 5.6 lb., 5% NaOH | 7.74 | 1.04 |
| 5.6 lb., 5% active No. 5, 5% NaOH | 11.43 | 4.73 |
| 5.6 lb., 5% active polyamine, 5% NaOH | 9.86 | 3.16* |
| Comparisons with Corn | | |
| No Starch | 6.34 | – |
| 5.6 lb. | 6.79 | 0.45 |
| 5.6 lb., 5% active No. 5 | 6.91 | 0.57 |
| 5.6 lb., 5% NaOH | 6.82 | 0.48 |
| 5.6 lb., 5% active No. 5, 5% NaOH | 9.05 | 2.71 |
| 5.6 lb., 5% active No. 5, 3% slaked lime | 9.39 | 3.05 |
| 5.6 lb., 5% active polyamine, 5% NaOH | 7.92 | 1.58* |

*The polymer does not contain reactive epoxy or halogen groups, gives lesser performance, and is used in the table for comparison purposes.

In the above, polymer and alkali applications are weight percentages based on the starch.

The above results for potato, tapioca, and corn starches indicate highest retention increases when using the starch reactive polymers under alkaline conditions.

Within the purview of this invention is contemplated a process of increasing filler retention of starch which comprises adding to the starch under alkaline conditions at the wet end of a papermaking system a cationic polymer formed by the reaction of polyepichlorohydrin and an amine.

DRAINAGE IMPROVEMENT

For drainage comparisons, a Williams Slowness Tester was used. Three gram portions of stock at 0.80 percent consistency were given a brief, mild mixing with the specific modified starch, charged to the testing unit, diluted with 25° C. water to the liter mark, stirred, and drainage time measured, according to standard testing procedure.

A re-pulped newsprint stock was used in which alum application was 2 percent and the pH was 4.5. The results are listed in the following table.

TABLE VIII

| Starch Application* | Williams Slowness, Seconds |
|---|---|
| Blank | 164 |
| 9 lb. potato reacted with 5% No. 5 & 5% NaOH | 128 |
| 9 lb. potato reacted with 2% No. 5 & 5% NaOH | 140 |
| 9 lb. potato reacted with 0.5% No. 5 & 5% NaOH | 147 |
| 9 lb. potato reacted with 5% No. 5 (no caustic used) | 149 |

*Starch applications are in pounds per ton of pulp. Polymer and caustic applications are percentages applied on weight of starch in cooking the starch.

The above data clearly shows the improvement in drainage for use in these modified starches.

CONCLUSION

Based upon the above data for wet end application of starches modified with the cationic polymers of this invention, paper burst strength is distinctly increased. By the use of polyepichlorohydrin-amine modified polymers, filler retention and drainage improvement can also be shown on the paper. In order for the practice of this invention, the starch must be reacted with the polyepichlorohydrin-amine polymer under alkaline aqueous conditions.

What we claim and desire to protect by Letters Patent is:

1. A method of cationization of starch which comprises reacting starch under alkaline conditions with a cationic polymer formed by the quaternization of polyepihalohydrin with a tertiary amine.

2. The method of claim 1 wherein the polyepihalohydrin is polyepichlorohydrin.

3. The method of claim 2 wherein the polyepichlorohydrin has a molecular weight from 1,000 to 100,000.

4. The method of claim 2 wherein the polyepichlorohydrin has a molecular weight of from 2,500 to 25,000.

5. The method of claim 2 wherein the amine is selected from the group consisting of trimethyl amine, dimethyl amine, pyridine, dibasic acid amines, ethylenimine, and dimethyl ethanol amine.

6. The method of claim 2 wherein the amine is trimethyl amine.

7. The method of claim 2 wherein the molar ratio of amine to chlorine equivalent of polyepichlorohydrin is from about 0.2:1 to 0.8:1.

8. The method of claim 1 wherein the cationic polymer is produced from the partial quaternization of polyepichlorohydrin and a trialkyl amine.

9. The method of claim 1 wherein the quaternization is from 15 to 80 percent complete.

10. A process of improving the retention of starch on paper pulp which comprises adding to the starch under alkaline conditions from 0.1 to 10.0 percent of a cationic polymer formed by the quaternization of polyepichlorohydrin with a tertiary amine.

11. A process of increasing filler retention of starch which comprises adding to the starch under alkaline conditions at the wet end of a papermaking system a cationic polymer formed by the quaternization of polyepichlorohydrin with a tertiary amine.

12. The process of claim 11 wherein the polyepichlorohydrin has a molecular weight from 1,000 to 100,000.

13. The process of claim 11 wherein the polyepichlorohydrin has a molecular weight of from 2,500 to 25,000.

14. The process of claim 11 wherein the amine is selected from the group consisting of trimethyl amine, dimethyl amine, pyridine, dibasic acid amines, ethylenimine, and dimethyl ethanol amine.

15. The process of claim 11 wherein the amine is trimethyl amine.

16. The process of claim 11 wherein the molar ratio of amine to chlorine equivalent of polyepichlorohydrin is from about 0.2:1 to 0.8:1.

17. The process of claim 11 wherein the cationic polymer is produced from the partial quaternization of polyepichlorohydrin and a trialkyl amine.

18. The process of claim 11 wherein the quaternization is from 15 to 80 percent complete.

* * * * *